United States Patent
Craig et al.

(10) Patent No.: US 9,765,644 B2
(45) Date of Patent: Sep. 19, 2017

(54) DEOILER DEBRIS BAFFLE

(71) Applicant: United Technologies Corporation, Hartford, CT (US)

(72) Inventors: Colin D. Craig, West Hartford, CT (US); Matthew J. Orsini, Wallingford, CT (US)

(73) Assignee: United Technologies Corporation, Farmington, CT (US)

( * ) Notice: Subject to any disclaimer, the term of this patent is extended or adjusted under 35 U.S.C. 154(b) by 196 days.

(21) Appl. No.: 14/600,910

(22) Filed: Jan. 20, 2015

(65) Prior Publication Data
US 2016/0208650 A1   Jul. 21, 2016

(51) Int. Cl.
| B01D 45/00 | (2006.01) |
| F01D 25/18 | (2006.01) |
| B01D 46/00 | (2006.01) |
| B01D 45/14 | (2006.01) |
| F01M 13/04 | (2006.01) |
| B04B 5/12  | (2006.01) |

(52) U.S. Cl.
CPC ............. *F01D 25/18* (2013.01); *B01D 45/14* (2013.01); *B01D 46/0023* (2013.01); *B04B 5/12* (2013.01); *B04B 2005/125* (2013.01); *F01M 13/04* (2013.01); *F01M 2013/0422* (2013.01); *F01M 2013/0433* (2013.01); *F05D 2260/607* (2013.01); *F05D 2260/609* (2013.01); *Y02T 50/671* (2013.01); *Y02T 50/675* (2013.01)

(58) Field of Classification Search
CPC .................. F01D 25/18; F01M 13/04; F01M 2013/0433; F01M 2013/0422; B01D 46/0023; B01D 45/14; F05D 2230/72; Y02T 50/671; B04B 2005/125; B04B 5/12
See application file for complete search history.

(56) References Cited

U.S. PATENT DOCUMENTS

| 4,049,401 | A  | 9/1977  | Smith |
| 5,716,423 | A  | 2/1998  | Krul |
| 7,717,101 | B2 | 5/2010  | Beetz |
| 8,002,864 | B2 | 8/2011  | Earith |
| 8,602,165 | B2 | 12/2013 | Szolomayer |
| 2004/0098956 | A1 | 5/2004 | Care |
| 2006/0042223 | A1 | 3/2006 | Walker |
| 2013/0313049 | A1 | 11/2013 | Short |
| 2014/0140824 | A1 | 5/2014 | Sheridan |
| 2014/0182252 | A1 | 7/2014 | Zecchi |

FOREIGN PATENT DOCUMENTS

WO    2014/138432    9/2014

*Primary Examiner* — Dung H Bui
(74) *Attorney, Agent, or Firm* — O'Shea Getz P.C.

(57) ABSTRACT

Aspects of the disclosure are directed to a system associated with an engine of an aircraft, comprising: a deoiler configured to receive a mixture of air and oil at an input of the deoiler and separate the air from the oil, and a baffle coupled to the input of the deoiler and configured to prevent debris that is larger than a threshold from entering the deoiler.

6 Claims, 3 Drawing Sheets

DEOILER DEBRIS BAFFLE

BACKGROUND

Debris in a closed lubrication system must be removed from the system to avoid impact to other components and/or detection by debris monitors, chip collectors, oil filters, etc. A deoiler, which is a device which separates oil from a breather air stream prior to venting the air overboard, may be contaminated by debris included in an oil flow entering the deoiler. It is possible for the debris to reside on a surface of the deoiler or within the deoiler until a later time when the debris can work free to re-contaminate an otherwise clean oil system.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure are directed to a system associated with an engine of an aircraft, comprising: a deoiler configured to receive a mixture of air and oil at an input of the deoiler and separate the air from the oil, and a baffle coupled to the input of the deoiler and configured to prevent debris that is larger than a threshold from entering the deoiler. In some embodiments, the deoiler is configured to provide the separated oil to an oil tank. In some embodiments, the deoiler is configured to provide the separated air to an overboard vent system. In some embodiments, the system further comprises a shaft coupled to the deoiler that is configured to rotate the deoiler. In some embodiments, the system further comprises a plurality of bearings configured to support the shaft. In some embodiments, the baffle is stationary. In some embodiments, the deoiler comprises a porous or mesh material that is configured to capture the mixture of air and oil. In some embodiments, the baffle comprises a plurality of pores, and a dimension of each of the pores is less than the threshold. In some embodiments, the dimension of each of the pores ensures against a bearing distress event.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
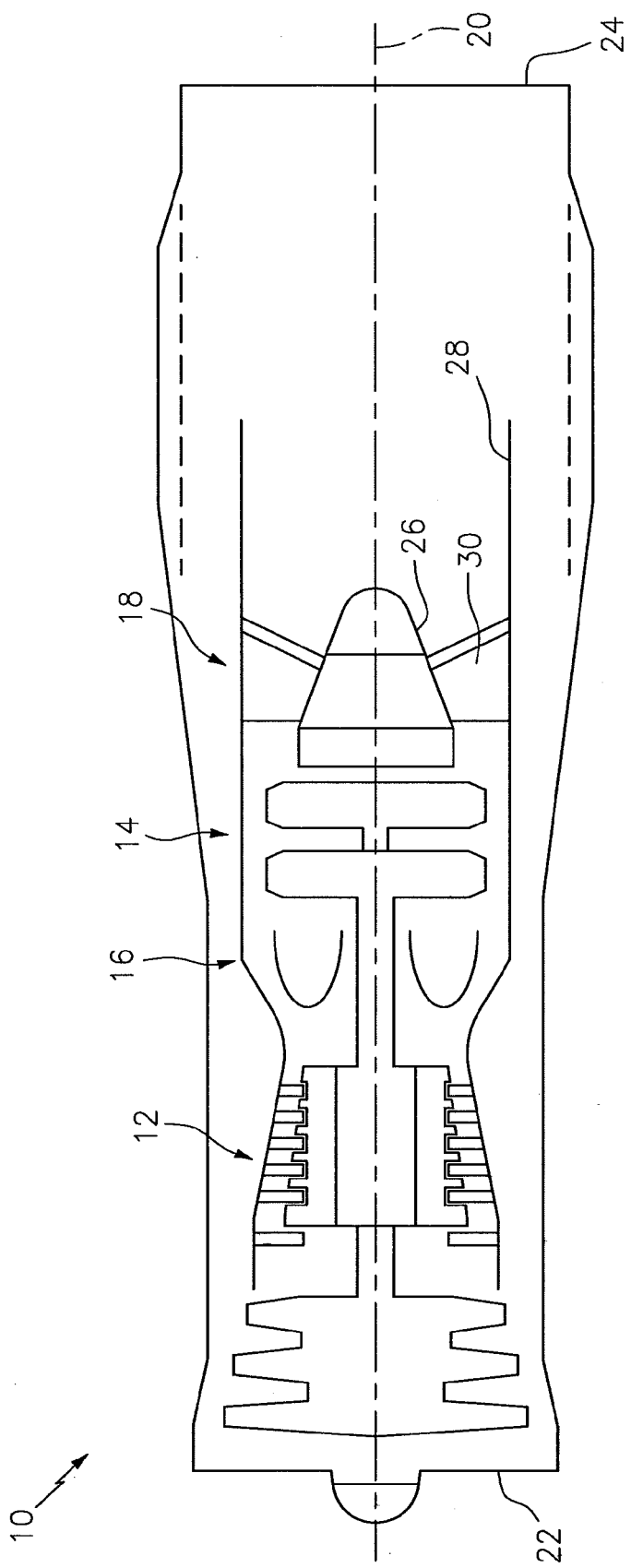
FIG. 1 illustrates an exemplary gas turbine engine in accordance with aspects of this disclosure.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

In accordance with various aspects of the disclosure, apparatuses, systems and methods are described for providing a deoiler debris baffle. The baffle may be used to prevent debris from entering a deoiler.

Aspects of the disclosure may be applied in connection with an aircraft, or portion thereof. For example, aspects of the disclosure may be applied in connection with a gas turbine engine. FIG. 1 is a side-sectional illustration of an exemplary gas turbine engine 10. The engine 10 includes a compressor section 12, a turbine section 14 and one or more engine hot sections. The engine hot sections may include, for example, a first engine hot section 16 configured as a combustor section and a second engine hot section 18 configured as an augmentor section. The compressor section 12, the first engine hot section 16, the turbine section 14 and the second engine hot section 18 may be sequentially aligned along an axial centerline 20 between a forward engine airflow inlet 22 and an aft engine airflow exhaust 24.

The second engine hot section 18 includes a first (e.g., annular, radial inner) duct case 26, a second (e.g., annular, radial outer) duct case 28, and one or more hot section vanes 30.

The engine 10 is illustrative. Aspects of the disclosure may be applied in connection with other engine types or configurations.

Figure 2:
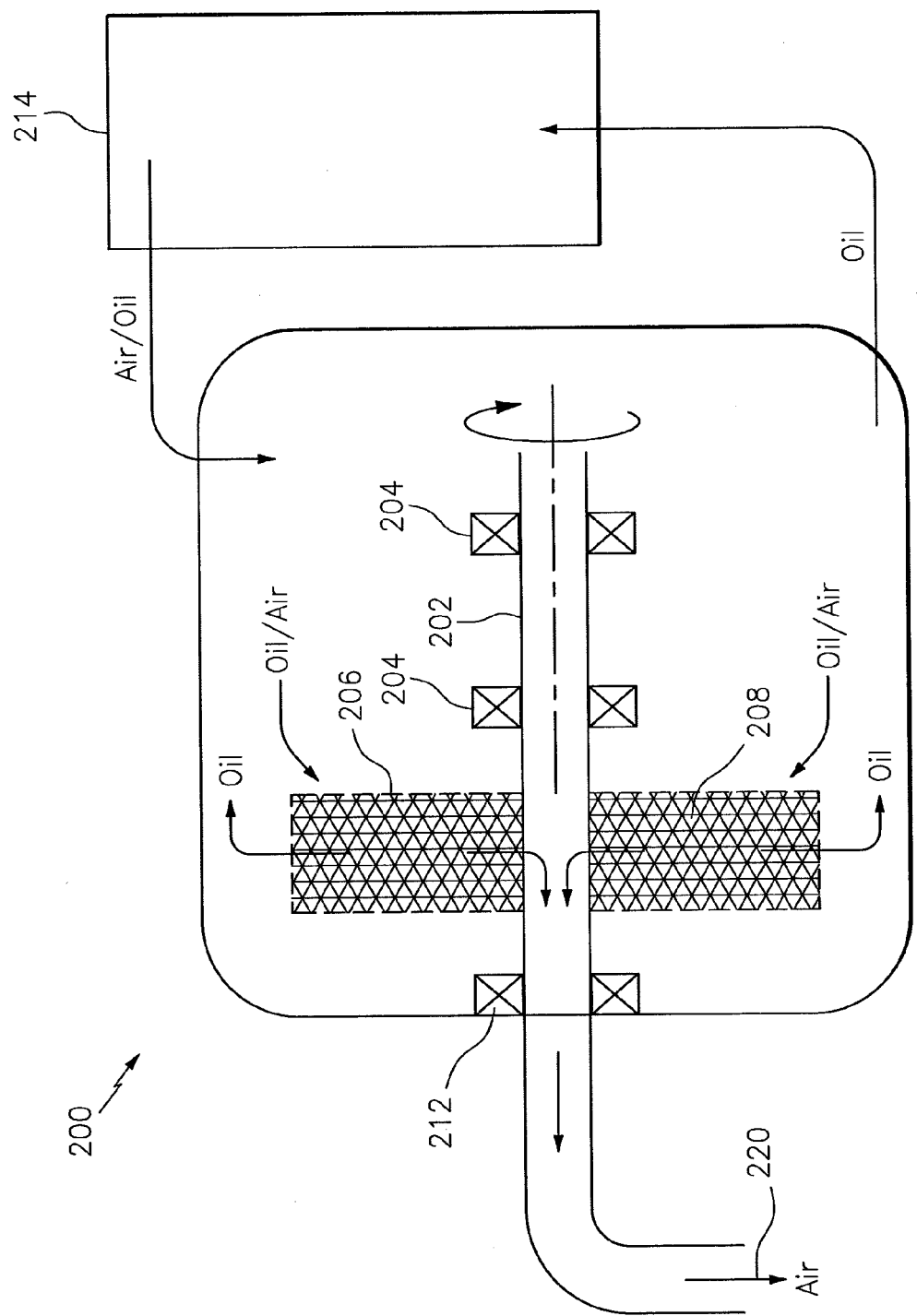
FIG. 2 illustrates a portion of an oil system in accordance with aspects of this disclosure.

Referring now to FIG. 2, a system 200 is shown. The system 200 may be associated with the engine 10 of FIG. 1. A portion of the system 200 may be representative of a portion of a gear box (e.g., an accessory gear box). The system 200 may be included as part of an oil system that may be used for purposes of providing cleaning, lubricating, or cooling of one or more components or devices.

The system 200 includes a shaft 202 (e.g., a drive shaft) coupled to one or more support bearings 204. The shaft 202 may be driven (by gears, not shown in FIG. 2) to cause a rotation of a deoiler 206 (e.g., a centrifugal deoiler). An input of the deoiler 206 may include, or be composed of, a porous or mesh material 208. The porous/mesh material 208 may be configured to capture/absorb a mixture of air and oil to allow the deoiler 206 to separate the air and the oil. The separated oil may be returned to an oil tank 214 for further oil system use/recirculation. The (separated) air may be vented via an overboard vent system as reflected via the reference character 220. A seal 212 (e.g., a mechanical oil seal) may be used to prevent or minimize a loss of oil in the system 200.

Figure 3:
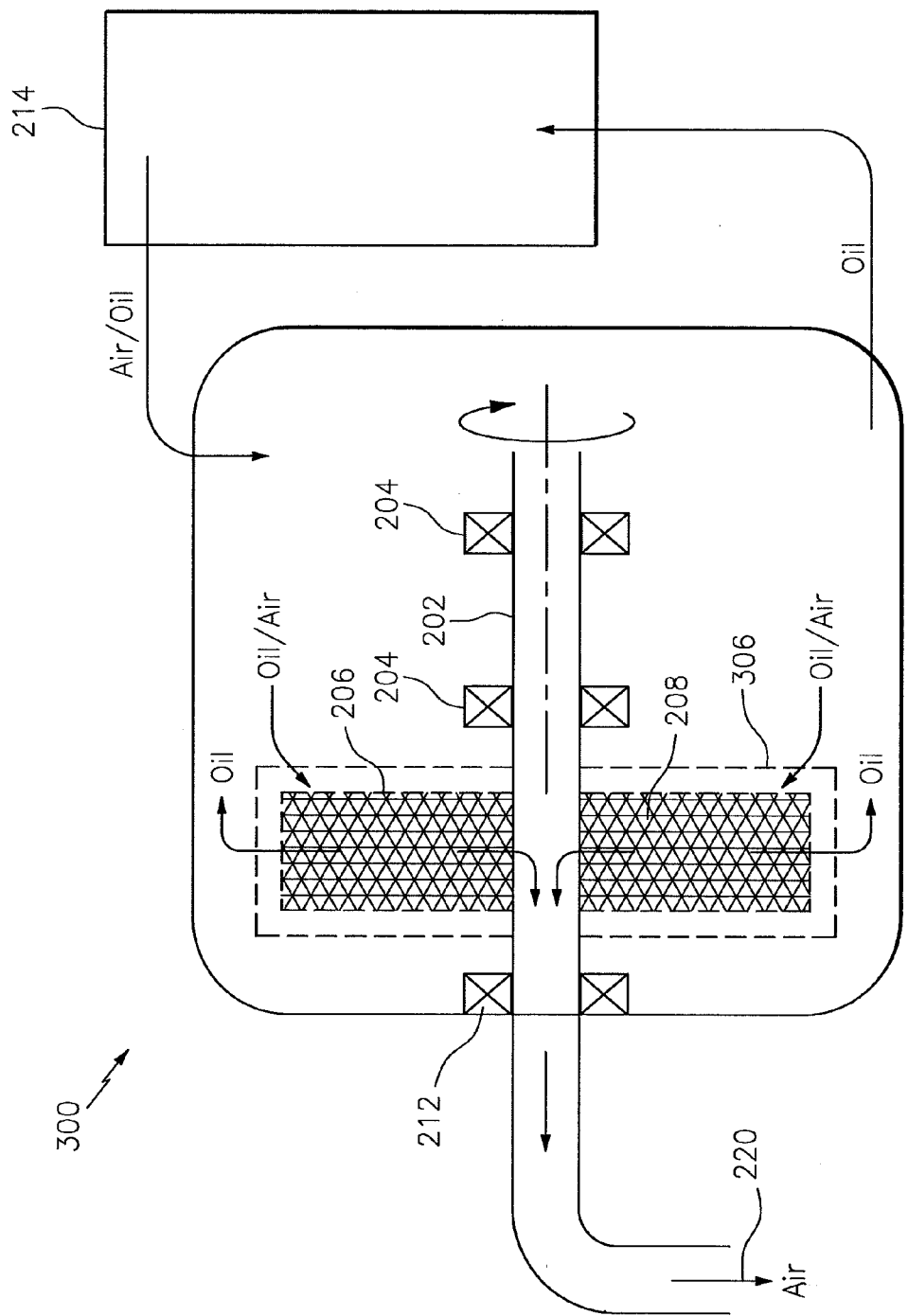
FIG. 3 illustrates a portion of an oil system incorporating a baffle in accordance with aspects of this disclosure.

Referring now to FIG. 3, a system 300 is shown. The system may include, or be associated with, the system 200 of FIG. 2, and so a complete re-description is omitted herein for the sake of brevity.

The system 300 includes a baffle 306 that may be coupled to, or associated with, the deoiler 206. In some embodiments, the baffle 306 may be a stationary structure.

The baffle 306 may prevent debris from entering the deoiler 206 by collecting or capturing the debris. In this manner, the baffle 306 may prevent debris from fouling the deoiler 206. The baffle 306 may be easily cleaned of the debris that the baffle 306 collects and may help to minimize inspection or trouble-shooting if, e.g., a monitor is used to detect debris in the deoiler 206.

The baffle 306 may include one or more pores. A size/dimension of the pores may be selected to be sufficiently small (e.g., less than a threshold) to preclude debris of a size/dimension that is larger than the pores from entering the deoiler 206. The size/dimension of the pores may be selected based on experience or environmental parameters/conditions. In some embodiments, the pore size/dimension may be selected/configured to ensure against a bearing distress event.

Technical effects and benefits of this disclosure include an optimization of a pore size to shed or trap certain ranges of debris. So, in addition to preventing debris contamination, the baffle can be configured to trap or retain debris for subsequent cleaning. By preventing deoiler fouling, and potentially collecting debris, oil system clean-up may be made more reliable. Inspection and cleaning of the baffle would be simple. Furthermore, nuisance or false-positives would be less likely to be generated in connection with a debris monitoring system.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional in accordance with aspects of the disclosure. One or more features described in connection with a first embodiment may be combined with one or more features of one or more additional embodiments.

What is claimed is:

1. An engine comprising:
    a deoiler configured to receive a mixture of air and oil at an input of the deoiler and separate the air from the oil;
    a baffle stationarily coupled to the input of the deoiler and configured to prevent debris that is larger than a threshold from entering the deoiler; and
    a shaft coupled to the deoiler that is configured to rotate the deoiler, the deoiler being a centrifugal deoiler,
    whereby the baffle is stationary when the deoiler rotates,
    wherein the baffle comprises a plurality of pores, and wherein a dimension of each of the pores is less than the threshold,
    wherein a compressor section, a combustor section, a turbine section, and an augmentor section are sequentially aligned along an axial centerline between an engine airflow inlet and an engine airflow exhaust,
    wherein the augmentor section includes a first duct case, a second duct case, and one or more vanes.

2. The engine of claim 1, wherein the deoiler is configured to provide the separated oil to an oil tank.

3. The engine of claim 1, wherein the deoiler is configured to provide the separated air to an overboard vent system.

4. The engine of claim 1, further comprising:
    a plurality of bearings configured to support the shaft.

5. The engine of claim 1, wherein the deoiler comprises a porous or mesh material that is configured to capture the mixture of air and oil.

6. The engine of claim 1, wherein the dimension of each of the pores ensures against a bearing distress event.

* * * * *